(12) United States Patent
Endou et al.

(10) Patent No.: US 7,683,151 B2
(45) Date of Patent: *Mar. 23, 2010

(54) PROCESS FOR PRODUCING MODIFIED POLYMER, MODIFIED POLYMER OBTAINED BY THE PROCESS, AND RUBBER COMPOSITION

(75) Inventors: Noriko Endou, Tokyo (JP); Youichi Ozawa, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 59 days.

This patent is subject to a terminal disclaimer.

(21) Appl. No.: 10/510,684

(22) PCT Filed: Apr. 11, 2003

(86) PCT No.: PCT/JP03/04632

§ 371 (c)(1),
(2), (4) Date: Oct. 8, 2004

(87) PCT Pub. No.: WO03/087171

PCT Pub. Date: Oct. 23, 2003

(65) Prior Publication Data

US 2005/0159554 A1  Jul. 21, 2005

(30) Foreign Application Priority Data

Apr. 12, 2002  (JP) .............................. 2002-110285

(51) Int. Cl.
C08F 36/06  (2006.01)
(52) U.S. Cl. .................... 526/335; 526/348.6; 526/340
(58) Field of Classification Search ............. 526/348.6, 526/335, 340
See application file for complete search history.

(56) References Cited

U.S. PATENT DOCUMENTS

| | | | | |
|---|---|---|---|---|
| 4,379,891 A | * | 4/1983 | Haynes | ....................... 525/342 |
| 6,008,295 A | * | 12/1999 | Takeichi et al. | ............. 525/105 |
| 6,191,247 B1 | * | 2/2001 | Ishikawa et al. | ............. 528/30 |
| 6,228,908 B1 | | 5/2001 | Takeichi et al. | |
| 6,274,688 B1 | | 8/2001 | Nakagawa et al. | |
| 6,369,167 B1 | * | 4/2002 | Morita et al. | ................ 525/342 |
| 6,403,693 B2 | * | 6/2002 | Materne et al. | ............. 524/492 |
| 6,573,412 B1 | * | 6/2003 | Hogan et al. | ................ 568/616 |
| 6,992,147 B1 | * | 1/2006 | Ozawa et al. | ................ 525/342 |
| 2005/0020757 A1 | | 1/2005 | Ozawa et al. | |
| 2005/0070672 A1 | | 3/2005 | Ozawa et al. | |

FOREIGN PATENT DOCUMENTS

| | | |
|---|---|---|
| EP | 0 067 468 A2 | 12/1982 |
| EP | 0 890 580 A | 1/1999 |
| EP | 1 113 024 A | 7/2001 |
| EP | 1 449 857 A | 8/2004 |
| JP | 56-104906 A | 8/1981 |
| JP | 2000-086998 A | 3/2000 |
| WO | 90-09403 | 8/1990 |
| WO | WO 01/34658 A1 | 5/2001 |
| WO | WO 01/87993 A | 11/2001 |

* cited by examiner

*Primary Examiner*—Kuo-Liang Peng
(74) *Attorney, Agent, or Firm*—Sughrue Mion, PLLC

(57) ABSTRACT

The present invention relates to a process for producing a modified polymer, comprising modifying a polymer having an active site of an organometal type in a molecule by reacting the site thereof with a hydrocarbyloxysilane compound and adding a condensation accelerator to the reaction system in the middle of the above reaction and/or after completion thereof and a rubber composition comprising the modified polymer obtained by the process described above, preferably a rubber composition comprising 100 parts by weight of (A) a rubber component containing at least 30% by weight of the above modified polymer and 10 to 100 parts by weight of (B) silica and/or carbon black.

36 Claims, No Drawings

PROCESS FOR PRODUCING MODIFIED POLYMER, MODIFIED POLYMER OBTAINED BY THE PROCESS, AND RUBBER COMPOSITION

BACKGROUND OF THE INVENTION

The present invention relates to a process for producing a modified polymer, a modified polymer obtained by the process and a rubber composition. More specifically, the present invention relates to a process for producing a modified polymer which enhances interactions with silica and carbon black when used for both of silica-blended and carbon black-blended rubber compositions and which elevates the fracture characteristic, the abrasion resistance and the low heat buildup property at the same time and can exhibit a good workability, a modified polymer having the characteristics described above which is obtained by the above process, a rubber composition comprising the above modified polymer and a tire prepared by using the above rubber composition.

RELATED ART

In recent years, requirement to a reduction in fuel consumption of cars is getting severer due to social requirement to energy saving. In order to meet such requirement, a reduction in a rolling resistance has been required to the performances of a tire. A method for optimizing a tire structure has been investigated as a method for reducing a rolling resistance of a tire, but it has so far been carried out as the most usual method to use a material generating less heat as a rubber composition.

In order to obtain a rubber composition generating less heat, a large number of techniques for enhancing a dispersibility of a filler used for a rubber composition has so far been developed. Among them, particularly a method in which a polymerizable active site of a diene base polymer obtained by anionic polymerization using a lithium compound is modified with a functional group having interaction with a filler is getting most popular.

Among such methods, known as representative method are a method in which carbon black is used for a filler to modify a polymerizable active site with a tin compound (Japanese Patent Publication No. 87630/1993) and a method in which carbon black is used in the same manner to introduce an amino group into a polymerizing active end (Japanese Patent Application Laid-Open No. 207342/1987).

On the other hand, in recent years, as concern about the safety of cars is elevated, requirement not only to a low fuel consumption performance but also to a performance on a wet road (hereinafter referred to as a wet performance), particularly a braking performance has been raised as well. Accordingly, not only a mere reduction in a rolling resistance but also a high compatibility of a wet performance with a low fuel consumption performance are required to the performances of a rubber composition in a tire tread.

A method using silica in place of carbon black which has so far usually been used as a reinforcing filler has already been carried out as a method for obtaining a rubber composition which provides a tire with a good low fuel consumption performance and a good wet performance at the same time.

However, it has been apparent as well that when silica is used for a reinforcing filler, the rubber composition is inevitably reduced in a fracture strength and an abrasion resistance as compared with those of a composition obtained by using carbon black. In addition thereto, silica is inferior in dispersibility, and the workability in carrying out kneading has been a large problem in practically producing a tire.

Then, in order to obtain a rubber composition having a good heating property at a high productivity, it is required that not only carbon black or silica is used alone, but also carbon black and silica are used in combination, and in addition thereto, required is an active site-modified polymer which has a wide interaction with a variety of such fillers and which can provide the fillers with a good dispersibility and the rubber composition with an abrasion resistance.

However, it is the existing situation that since an active site-modified polymer has so far been developed assuming that a single filler is used, active site-modified polymers having a satisfactory interaction with various fillers regardless of the kind of the fillers are restricted very much.

For example, the tin compound described above has a large dispersing effect to carbon black but has little dispersing effect to silica, and in addition thereto, it does not exhibit at all a reinforcing effect. Further, a dispersing effect of aminosilane to silica is reported in Japanese Patent Application Laid-Open No. 151275/1997, but the effect thereof is not necessarily satisfactory.

On the other hand, disclosed are methods in which used are alkoxysilanes providing silica with a dispersing effect and having an effect for improving a reinforcing property (Japanese Patent Application Laid-Open No. 188501/1989, Japanese Patent Application Laid-Open No. 53513/1996 and Japanese Patent Application Laid-Open No. 53576/1996), but the effect thereof is unsatisfactory.

Further, disclosed is a modified polymer obtained by introducing alkoxysilane having a dialkylamino group into an active end of a polymer obtained by anionic polymerization using alkyllithium or lithium amide as a polymerization initiator (Japanese Patent Publication No. 57767/1984). However, when the above modified polymer is used, obtained are the reinforcing property to silica blended and the certain dispersing effect to both of silica and carbon black in addition to the good workability, but because of expensive alkoxysilane having a dialkylamino group, a modified polymer obtained by using it is expensive as well, so that industrialization thereof has been difficult.

Further, disclosed as well is a method in which a silanol condensation catalyst is added in blending to a rubber composition containing silica and a silane coupling agent (Japanese Patent Application Laid-Open No. 67887/1998 and Japanese Patent Application Laid-Open No. 248117/2000), but though the reinforcing property to silica blended and the dispersing effect to silica are obtained, the physical property-improving effect brought about by the dispersing effect is unsatisfactory since a polymer obtained by modifying an end thereof with hydrocarbyloxysilane is not used.

On the other hand, a polymer having an active site which is used in producing a modified polymer is obtained usually by subjecting a conjugated diene compound alone or a conjugated diene compound and an aromatic vinyl compound to anionic polymerization. It is not easy in terms of the characteristics of the anionic polymerization to introduce a functional group such as a primary amino group and a organic onium base which are expected to have a large effect for improving the physical properties into an active site of the polymer obtained by the above anionic polymerization, and post-polymerization treatment under severe conditions and an expensive protective group are required, so that the industrial value thereof has been low.

In the above methods, maximum one functional group is introduced into an active site of the polymer, and in order to introduce a plurality of the functional groups described above into one molecule of the polymer, complicated synthetic techniques such as use of a dilithium base initiator and a macro monomer have to be used, so that they are not necessarily methods which are liable to be industrially used. Further, in preparing a rubber composition, it is tried to improve the physical properties by subjecting a hydrocarbyl compound and a silane-modified polymer to thermomechanical treatment. In this case, however, not only the effect thereof is unsatisfactory, but also brought about are the problems that valuable machine time in a kneading machine is spent and that an alcohol volatilization amount in the kneading machine is increased, and therefore they are not necessarily industrially preferred methods.

DISCLOSURE OF THE INVENTION

Under such circumstances, an object of the present invention is to provide a process for producing a modified polymer which enhances interactions with silica and carbon black when it is used for both of silica-blended and carbon black-blended rubber compositions to raise the fracture characteristic, the abrasion resistance and the low heat buildup property at the same time and which can exhibit a good workability, a modified polymer having the characteristics described above which is obtained by the above process, a rubber composition comprising the above modified polymer and a tire prepared by using the above rubber composition.

Intensive researches repeated by the present inventors in order to achieve the object described above have resulted in finding that a rubber composition is improved in performances to a large extent as compared with those of a modified polymer to which a condensation accelerator is not added by a modified polymer obtained by first introducing a hydrocarbyloxysilane compound residue into the active site of a polymer having an active site and then adding thereto a condensation accelerator, and thus they have come to complete the present invention.

That is, the present invention provides:

(1) a process for producing a modified polymer, comprising modifying a polymer having an active site of an organometal type in a molecule by reacting the site thereof with a hydrocarbyloxysilane compound and adding a condensation accelerator to the reaction system in the middle of the reaction and/or after completion thereof, (2) the process for producing a modified polymer as described in the above item (1), wherein the polymer described above is a polymer obtained by polymerizing a conjugated diene compound alone or a conjugated diene compound and other monomers, (3) the process for producing a modified polymer as described in the above item (1) or (2), wherein the metal in the active site described above is at least one selected from alkaline metals and alkaline earth metals, (4) a modified polymer obtained by the production process as described in any of the above items (1) to (3), (5) a rubber composition comprising the modified polymer as described in the above item (4), (6) the rubber composition as described in the above item (5), comprising 100 parts by weight of (A) a rubber component containing at least 15% by weight of the modified polymer as described in the above item (4) and 10 to 100 parts by weight of (B) an inorganic filler and/or carbon black, (7) a rubber composition prepared by adding a condensation accelerator in blending to a modified polymer obtained by reacting the active site of a polymer having an active site of an organometal type in a molecule with a hydrocarbyloxysilane compound, and (8) a tire prepared by using the rubber composition as described in any of the above items (5) to (7).

BEST MODE FOR CARRYING OUT THE INVENTION

First, the process for producing the modified polymer according to the present invention shall be explained.

In the process for producing the modified polymer according to the present invention, a polymer having an active site of an organometal type in a molecule is modified by introducing a hydrocarbyloxysilane compound residue into the site thereof, and then a condensation accelerator is added to the reaction system.

Further, in the present invention, the polymer can be modified as well by introducing the hydrocarbyloxysilane compound residue into the active site of the polymer having an active site of an organometal type in a molecule without adding the condensation accelerator in a modifying stage of the polymer and then adding the condensation accelerator to the modified polymer thus obtained in blending.

A process for producing the polymer having an active site of an organometal type in a molecule which is used in the process of the present invention shall not specifically be restricted, and any of a solution polymerizing process, a gas phase polymerizing process and a bulk polymerizing process can be used. The solution polymerizing process is particularly preferred. The polymerizing system may be any of a batch system and a continuous system.

The metal in the active site described above is preferably one selected from alkaline metals and alkaline earth metals, and lithium metal is particularly preferred.

In the solution polymerizing process described above, the intended polymer can be produced by subjecting a conjugated diene compound alone or a conjugated diene compound and an aromatic vinyl compound to anionic polymerization using a lithium compound as an initiator.

Further, it is effective as well to activate a halogen atom in a polymer obtained in the presence of a halogen-containing monomer with an organometalic compound. For example, it is effective as well to subject a bromine part of a copolymer containing an isobutylene unit, a paramethylstyrene unit and a parabromomethylstyrene unit to lithiation to turn it to an active site.

The active site described above shall not specifically be restricted as long as it is present in the molecule of the polymer, and when the polymer is produced by anionic polymerization using an alkaline metal compound and/or an alkaline earth metal compound as a polymerization initiator, the active site described above is usually positioned in an end of the polymer.

The conjugated diene compound described above includes, for example, 1,3-butadiene; isoprene; 1,3-pentadiene; 2,3-dimethylbutadiene; 2-phenyl-1,3-butadiene; and 1,3-hexadiene. They may be used alone or in combination of two or more kinds thereof. Among them, 1,3-butadiene and isoprene are particularly preferred.

Further, the aromatic vinyl compound used for copolymerizing with the above conjugated diene compounds includes, for example, styrene; α-methylstyrene; 1-vinylnaphthalene; 3-vinyltoluene; ethylvinylbenzene; divinylbenzene; 4-cyclohexylstyrene; and 2,4,6-trimethylstyrene. They may be used alone or in combination of two or more kinds thereof. Among them, styrene is particularly preferred.

Further, when the conjugated diene compound and the aromatic vinyl compound are used as the monomers to carry out copolymerization, 1,3-butadiene and styrene each are particularly suitably used in terms of practicality such as easiness in availability of the monomers and because of anionic polymerizing characteristics excellent in terms of a living property.

When using the solution polymerizing process, the monomer concentration in the solvent is preferably 5 to 50% by weight, more preferably 10 to 30% by weight. When the conjugated diene compound and the aromatic vinyl compound are used to carry out copolymerization, a content of the aromatic vinyl compound in the charged monomer mixture falls in a range of preferably 3 to 50% by weight, more preferably 5 to 45% by weight.

The lithium compound which is a polymerization initiator shall not specifically be restricted, and hydrocarbyllithium and lithium amide compounds are preferably used. When using the hydrocarbyllithium of the former, obtained is a conjugated diene base polymer having a hydrocarbyl group at a polymerization-starting end and having a polymerizable active site at the other end. Further, when using the lithium amide compound of the latter, obtained is a conjugated diene base polymer having a nitrogen-containing group at a polymerization-starting end and having a polymerizable active site at the other end.

The hydrocarbyllithium described above is preferably a compound having a hydrocarbyl group having 2 to 20 carbon atoms and includes, for example, eythyllithium, n-propyllithium, isopropyllithium, n-butyllithium, sec-butyllithium, tert-octyllithium, n-decyllithium, phenyllithium, 2-naphthyllithium, 2-butylphenyllithium, 4-phenyl-butyllithium, cyclohexyllithium, cyclopentyllithium and a reaction product of diisopropenylbenzen and butyllithium. Among them, n-butyllithium is preferred.

On the other hand, the lithium amide compound includes, for example, lithium hexamethyleneimide, lithium pyrrolidide, lithium piperidide, lithium heptamethyleneimide, lithium dodecamethyleneimide, lithium dimethylamide, lithium diethylamide, lithium dibutylamide, lithium dipropylamide, lithium diheptylamide, lithium dihexylamide, lithium dioctylamide, lithium di-2-ethylhexylamide, lithium didecylamide, lithium-N-methylpiperidide, lithium ethylpropylamide, lithium ethylbutylamide, lithium methylbutylamide, lithium ethylbenzylamide and lithium methylphenethylamide. Among them, cyclic lithium amides such as lithium hexamethyleneimide, lithium pyrrolidide, lithium piperidide, lithium heptamethyleneimide and lithium dodecamethyleneimide are preferred from the viewpoint of an interaction effect to carbon black and a polymerization starting ability. In particular, lithium hexamethyleneimide and lithium pyrrolidide are suited.

The above lithium amide compounds are usually prepared in advance from secondary amines and lithium compounds and then used in many cases, but they can be prepared as well in the polymerizing system (in-situ). A use amount of the above polymerization initiator is selected in a range of preferably 0.2 to 20 millimole per 100 g of the monomers.

A process for producing the conjugated diene base polymer by anionic polymerization using the lithium amide compound as the polymerization initiator shall not specifically be restricted, and conventionally known processes can be used.

To be specific, the intended conjugated diene base polymer can be obtained by anionically polymerizing the conjugated diene compound or the conjugated diene compound and the aromatic vinyl compound in an organic solvent which is inactive to the reaction, for example, a hydrocarbon base solvent such as aliphatic, alicyclic and aromatic hydrocarbon compounds using the lithium amide compound as the polymerization initiator in the presence of a randomizer which is used if necessary.

The hydrocarbon base solvent described above is preferably a compound having 3 to 8 carbon atoms, and capable of being given are, for example, propane, n-butane, isobutane, n-pentane, isopentane, n-hexane, cyclohexane, propene, 1-butene, isobutene, trans-2-butene, cis-2-butene, 1-pentene, 2-pentene, 1-hexene, 2-hexene, benzene, toluene, xylene and ethylbenzene. They may be used alone or in a mixture of two or more kinds thereof.

The randomizer which is used if necessary is a compound having actions such as controlling of a micro structure of the conjugated diene polymer, for example, an increase in a 1,2 bond of a butadiene part in a butadiene-styrene copolymer and a 3,4 bond in an isoprene polymer or controlling of composition distribution of a monomer unit in a conjugated diene compound-aromatic vinyl compound copolymer, for example, randomization of a butadiene unit and a styrene unit in a butadiene and styrene copolymer. The above randomizer shall not specifically be restricted, and optional compounds suitably selected from publicly known compounds which have so far usually been used as a randomizer can be used. To be specific, capable of being given are ethers and tertiary amines such as dimethoxybenzene, tetrahydrofuran, dimethoxyethane, diethylene glycol dibutyl ether, diethylene glycol dimethyl ether, bistetrahydrofurfurylpropane, triethylamine, pyridine, N-methylmorpholine, N,N,N',N'-tetramethylethylenediamine and 1,2-dipiperidinoethane. Further, potassium salts such as potassium t-amylate and potassium t-butoxide and sodium salts such as sodium t-amylate can be used as well.

The above randomizers may be used alone or in combination of two or more kinds thereof. A use amount thereof is selected in a range of preferably 0.01 to 1000 mole equivalent per mole of the lithium compound.

A temperature in the above polymerization is selected in a range of preferably 0 to 150° C., more preferably 20 to 130° C. The polymerization reaction can be carried out under applied pressure, but usually it is carried out at pressure which is sufficient for maintaining the monomers substantially to a liquid phase. That is, though the pressure depends on the individual materials polymerized, the polymerization medium used and the polymerizing temperature, higher pressure can be used if necessary. Such pressure can be obtained by a suitable method such as pressurizing a reactor by gas which is inert to polymerization reaction.

In the above polymerization, all raw materials which take part in the polymerization, such as the polymerization initiator, the solvent, the monomers and the like are preferably used after removing reaction-inhibiting substances such as water, oxygen, carbon dioxide, protic compounds and the like.

When obtaining the polymer in the form of an elastomer, the polymer or copolymer obtained has preferably a glass transition point (Tg) of −110 to −15° C. determined by a differential thermal analytical method. It is difficult to obtain the polymer having a glass transition point of lower than −110° C., and if the glass transition point exceeds −15° C., the viscosity is too high in a room temperature range to make handling difficult in a certain case.

In the present invention, used is a method in which the hydrocarbyloxysilane compound is added to the polymer thus obtained having an active site of an organometal type in a molecule in a stoichiometric amount or an excess amount thereover based on the above active site, more preferably 0.3 mole equivalent or more based on the apparent active site (usually, one mole of the hydrocarbyloxysilane compound for modification corresponds to several mole equivalents of the active site) to react the above active site with the hydrocarbyloxysilane compound to substantially introduce the hydrocarbyloxysilane compound residue into the above active site and in which the condensation accelerator is then added.

In respect to timing for adding the condensation accelerator, it is preferably added to the reaction system immediately after the modification in which the hydrocarbyloxysilane compound residue is introduced, and the condensation accelerator may be added as well in blending after drying the polymer modified by the above reaction, preferably in the first stage in blending.

The polymer used in the above modification reaction has preferably the above active site in at least 20% of a polymer chain.

In the modifying method described above, capable of being used as the hydrocarbyloxysilane compound used for modifying the active site of the polymer is, for example, a hydrocarbyloxysilane compound represented by Formula (I) and/or a partial condensation product thereof:

(I)

wherein $A^1$ represents a monovalent group having at least one functional group selected from (thio)epoxy, (thio)isocyanate, (thio)ketone, (thio)aldehyde, imine, amide, isocyanuric acid triester, hydrocarbyl (thio)carboxylate, metal salts of (thio)carboxylic acid esters, carboxylic anhydride, carboxylic acid halide and dihydrocarbyl carbonate; $R^1$ represents a single bond or a divalent inactive hydrocarbon group; $R^2$ and $R^3$ each represent independently a monovalent aliphatic hydrocarbon group having 1 to 20 carbon atoms or a monovalent aromatic hydrocarbon group having 6 to 18 carbon atoms; n is an integer of 0 to 2, and when a plurality of $OR^3$ is present, a plurality of $OR^3$ may be the same as or different from each other; and an active proton and an onium salt are not contained in the molecule. In this case, the partial condensation product is the hydrocarbyloxysilane compound in which a part (not all) of SiOR is turned into an SiOSi bond by condensation.

In Formula (I) described above, among the functional groups in $A^1$, imine includes ketimine, aldimine and amidine, and (thio)carboxylic acid ester includes unsaturated carboxylic acid esters such as acrylate and methacrylate. Alkaline metals, alkaline earth metals, Al, Sn and Zn can be given as the metal in the metal salts of (thio)carboxylic acid.

An alkylene group having 1 to 20 carbon atoms can preferably be given as the divalent inactive hydrocarbon group represented by $R^1$. The above alkylene group may be linear, branched or cyclic, and the linear alkylene group is particularly suited. The examples of the above linear alkylene group includes methylene, ethylene, trimethylene, tetramethylene, pentamethylene, hexamethylene, octamethylene, decamethylene and dodecamethylene.

An alkyl group having 1 to 20 carbon atoms, an alkenyl group having 2 to 20 carbon atoms, an aryl group having 6 to 18 carbon atoms and an aralkyl group having 7 to 18 carbon atoms can be given as $R^2$ and $R^3$. In this case, the alkyl group and the alkenyl group each described above may be linear, branched or cyclic, and the examples thereof include methyl, ethyl, n-propyl, isopropyl, n-butyl, isobutyl, sec-butyl, tert-butyl, pentyl, hexyl, octyl, decyl, dodecyl, cyclopentyl, cyclohexyl, vinyl, propenyl, allyl, hexenyl, octenyl, cyclopentenyl and cyclohexenyl.

The above aryl group may have a substituent such as a lower alkyl group on an aromatic ring, and the examples thereof include phenyl, tolyl, xylyl and naphthyl. Further, the above aralkyl group may have a substituent such as a lower alkyl group on an aromatic ring, and the examples thereof include benzyl, phenethyl and naphthylmethyl.

The term n is an integer of 0 to 2, and it is preferably 0. An active proton and an onium salt do not have to be contained in the molecule.

Capable of being preferably given as the hydrocarbyloxysilane compound represented by the above Formula (I) are, for example, (thio)epoxy group-containing hydrocarbyloxysilane compounds such as 2-glycidoxyethyltrimethoxysilane, 2-glycidoxyethyltriethoxysilane, (2-glycidoxyethyl)methyldimethoxysilane, 3-glycidoxypropyltrimethoxysilane, 3-glycidoxypropyltriethoxysilane, (3-glycidoxypropyl)methyldimethoxysilane, 2-(3,4-epoxycyclohexyl)ethyltrimethoxysilane, 2-(3,4-epoxycyclohexyl)ethyltriethoxysilane, 2-(3,4-epoxycyclohexyl)ethyl(methyl)dimethoxysilane and compounds obtained by substituting an epoxy group in the above compounds with a thioepoxy group. Among them, 3-glycidoxypropyltrimethoxysilane and 3-glycidoxypropyltriethoxysilane are particularly suited.

Capable of being preferably given as an imine group-containing hydrocarbyloxysilane compound are N-(1,3-dimethylbutylidene)-3-(triethoxysilyl)-1-propaneamine, N-(1-methylethylidene)-3-(triethoxysilyl)-1-propaneamine, N-ethylidene-3-(triethoxysilyl)-1-propaneamine, N-(1-methylpropylidene)-3-(triethoxysilyl)-1-propaneamine, N-(4-N,N-dimethylaminobenzylidene)-3-(triethoxysilyl)-1-propaneamine, N-(cyclohexylidene)-3-(triethoxysilyl)-1-propaneamine, and trimethoxysilyl compounds, methyldiethoxysilyl compounds, ethyldiethoxysilyl compounds, methyldimethoxysilyl compounds and ethyldimethoxysilyl compounds each corresponding to the above triethoxysilyl compounds. Among them, N-(1-methylpropylidene)-3-(triethoxysilyl)-1-propaneamine and N-(1,3-dimethylbutylidene)-3-(triethoxysilyl)-1-propaneamine are particularly suited. Another examples of an imine(amidine) group-containing compound include 1-[3-(triethoxysilyl)propyl]-4,5-dihydroimidazole, 1-[3-(trimethoxysilyl)propyl]-4,5-dihydroimidazole, N-(3-triethoxysilylpropyl)-4,5-dihydroimidazole, N-(3-isopropoxysilylpropyl)-4,5-dihydroimidazole and N-(3-methyldiethoxysilylpropyl)-4,5-dihydroimidazole, and among them, N-(3-triethoxysilylpropyl)-4,5-dihydroimidazole is preferred.

Further, the other hydrocarbyloxysilane compounds include carboxylic acid ester group-containing compounds. To be specific, they include 3-methacryloxypropyltriethoxysilane, 3-methacryloxypropyltrimethoxysilane, 3-methacryloxypropylmethyldiethoxysilane and 3-methacryloxypropyltriisopropoxysilane, and among them, 3-methacryloxypropyltrimethoxysilane is preferred.

Also, the hydrocarbyloxysilane compound includes isocyanate group-containing compounds. To be specific, it includes 3-isocyanatepropyltrimethoxysilane, 3-isocyanatepropyltriethoxysilane, 3-isocyanatepropylmethyldiethoxysilane and 3-isocyanatepropyltriisopropoxysilane, and among them, 3-isocyanatepropyltriethoxysilane is preferred.

Further, the hydrocarbyloxysilane compound includes carboxylic anhydride-containing compounds. To be specific, it includes 3-triethoxysilylpropylsuccinic anhydride, 3-trimethoxysilylpropylsuccinic anhydride and 3-methyldiethoxysilylpropylsuccinic anhydride, and among them, 3-triethoxysilylpropylsuccinic anhydride is preferred.

The above hydrocarbyloxysilane compounds (I) may be used alone or in combination of two or more kinds thereof.

Next, in the modifying method described above, capable of being used as the hydrocarbyloxysilane compound used for modifying the active site of the polymer is, for example, a hydrocarbyloxysilane compound represented by Formula (II) and/or a partial condensation product thereof:

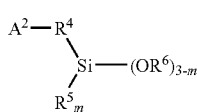

(II)

wherein $A^2$ represents a monovalent group having at least one functional group selected from cyclic tertiary amines, non-cyclic tertiary amines, nitrile, pyridine, sulfide and multisulfide; $R^4$ represents a single bond or a divalent inactive hydrocarbon group; $R^5$ and $R^6$ each represent independently a monovalent aliphatic hydrocarbon group having 1 to 20 carbon atoms or a monovalent aromatic hydrocarbon group having 6 to 18 carbon atoms; m is an integer of 0 to 2, and when a plurality of $OR^6$ is present, a plurality of $OR^6$ may be the same as or different from each other; and an active proton and an onium salt are not contained in the molecule. In this case, the partial condensation product is the same as described in Formula (I).

In Formula (II) described above, among the groups represented by $A^2$, the non-cyclic tertiary amines includes N,N-disubstituted amines such as N,N-disubstituted aniline, and the cyclic tertiary amines can contain a (thio)ether bond as a part of the ring. The divalent inactive hydrocarbon group out of those represented by $R^4$ and the groups represented by $R^5$ and $R^6$ are the same as explained for $R^1$, $R^5$ and $R^6$ in Formula (I). An active proton and an onium salt do not have to be contained in the molecule.

Capable of being given as the hydrocarbyloxysilane compound represented by the above Formula (II) are, for example, non-cyclic tertiary amine group-containing hydrocarbyloxysilane compounds such as 3-dimethylaminopropyl(triethoxy)silane, 3-dimethylaminopropyl(trimethoxy)silane, 3-diethylaminopropyl(triethoxy)silane, 3-diethylaminopropyl(trimethoxy)silane, 2-dimethylaminoethyl(triethoxy)silane, 2-dimethylaminoethyl(trimethoxy)silane, 3-dimethylaminopropyl(diethoxy)methylsilane and 3-dibutylaminopropyl(triethoxy)silane, and among them, 3-dimethylaminopropyl(triethoxy)silane and 3-dimethylaminopropyl(triethoxy)silane are suited.

Further, capable of being give as a cyclic tertiary amine group-containing hydrocarbyloxysilane compound are 3(hexamethyleneimino)propyl(triethoxy)silane, 3-(1-hexamethyleneimino)propyl(trimethoxy)silane, (1-hexamethyleneimino)methyl(trimethoxy)silane, (1-hexamethyleneimino)methyl(triethoxy)silane, 2-(1-hexamethyleneimino)ethyl(triethoxy)silane, 2-(1-hexamethyleneimino)ethyl(trimethoxy)silane, 3-(1-pyrrodinyl)propyl(triethoxy)silane, 3-(1-pyrrodinyl)propyl(trimethoxy)silane, 3-(1-heptamethyleneimino)propyl(triethoxy)silane, 3-(1-dodecamethyleneimino)propyl(triethoxy)silane, 3-(1-hexamethyleneimino)propyl(diethoxy)methylsilane, 3-(1-hexamethyleneimino)propyl(diethoxy)ethylsilane and 3-[10-(triethoxysilyl)decyl]-4-oxazoline, and among them, 3-(1-hexamethyleneimino)propyl(triethoxy)silane and (1-hexamethyleneimino)propyl(trimethoxy)silane can preferably be given.

In particular, 3-(1-hexamethyleneimino)propyl(triethoxy)silane is suited.

Further, 2-(trimethoxysilylethyl)pyridine, 2-(triethoxysilylethyl)pyridine and 2-cyanoethyltriethoxysilane can be given as the other hydrocarbyloxysilane compounds.

The above hydrocarbyloxysilane compounds (II) may be used alone or in combination of two or more kinds thereof.

Also, in the modifying method described above, capable of being used as the hydrocarbyloxysilane compound used for modifying the active site of the polymer is, for example, a hydrocarbyloxysilane compound represented by Formula (III) and/or a partial condensation product thereof $$R^7_p\text{—Si}(OR^8)_{4-p} \qquad (III)$$

wherein $R^7$ and $R^8$ each represent independently a monovalent aliphatic hydrocarbon group having 1 to 20 carbon atoms or a monovalent aromatic hydrocarbon group having 6 to 18 carbon atoms; p is an integer of 0 to 2, and when a plurality of $OR^8$ is present, a plurality of $OR^8$ may be the same as or different from each other; and an active proton and an onium salt are not contained in the molecule. In this case, the partial condensation product is the same as described in Formula (I).

In Formula (III) described above, $R^7$ and $R^8$ are the same as explained for $R^2$ and $R^3$ in Formula (I).

Capable of being given as the hydrocarbyloxysilane compound represented by the above Formula (III) are, for example, tetramethoxysilane, tetraethoxysilane, tetra-n-propoxysilane, tetraisopropoxysilane, tetra-n-butoxysilane, tetraisobutoxysilane, tetra-sec-butoxysilane, tetra-tert-butoxysilane, methyltrimethoxysilane, methyltriethoxysilane, methyltripropoxysilane, methyltriisopropoxysilane, ethyltrimethoxysilane, ethyltriethoxysilane, propyltriethoxysilane, butyltrimethoxysilane, phenyltrimethoxysilane, phenyltriethoxysilane, dimethyldimethoxysilane, methylphenyldimethoxysilane, vinyltrimethoxysilane, vinyltriethoxysilane, divinyldimethoxysilane and divinyldiethoxysilane, and among them, tetraethoxysilane is particularly suited.

The above hydrocarbyloxysilane compounds (III) may be used alone or in combination of two or more kinds thereof.

In the above modification, an optional mixture of the hydrocarbyloxysilane compounds represented by Formulas (I), (II) and (III) described above can be used as the hydrocarbyloxysilane compound used for modifying the active site of the polymer.

In the above modification reaction in the present invention, either of a solution reaction and a solid phase reaction can be used, and the solution reaction (allowed to contain the unreacted monomers used in the polymerization) is suited. The system of the above modification reaction shall not specifically be restricted, and it may be carried out by means of a batch type reactor and may be carried out by a continuous system by means of an apparatus such as a multistage continuous type reactor and an inline mixer. Further, it is important to carry out the above modification reaction before carrying out desolvent treatment, water treatment, heat treatment and the like after reaching the conversion rate at which the polymerization reaction is expected to be finished.

The modification reaction is carried out preferably at a temperature of 20° C. or higher, and the polymerizing temperature of the conjugated diene base polymer can be used as it is. The more preferred range includes 30 to 120° C. If the reaction temperature is lowered, the polymer tends to rise too much in a viscosity, and the reaction product tends to be deteriorated in dispersibility. On the other hand, if the reaction temperature gets higher, the polymerization active site tends to be liable to be deactivated.

In the above modification reaction, condensation of the hydrocarbyloxysilane compound residue introduced into the active site of the polymer or condensation with the hydrocarbyloxysilane compound is carried out preferably in the presence of the condensation accelerator. In general, combination of a metal compound which is known as a curing catalyst for alkoxy condensation-curing type room temperature bridging (RTV) silicon with water can be used as the above condensation accelerator, and combination of, for example, carboxylic acid salt of tin and/or titanium alkoxide with water can preferably be given. Water may be added to the reaction system in the form of a solution of an organic solvent such as alcohol which is compatible with water or water may be added and dispersed directly in a hydrocarbon solution by means of a chemical engineering method.

The metal compound used as the condensation accelerator is preferably a tin compound having an oxidation number of 2 represented by the following Formula (IV):

$$Sn(OCOR^9)_2 \quad (IV)$$

(wherein $R^9$ is an alkyl group having 2 to 19 carbon atoms), a tin compound having an oxidation number of 4 represented by the following Formula (V):

$$R^{10}{}_x SnA^3{}_y B^1{}_{4-y-x} \quad (V)$$

(wherein $R^{10}$ is an aliphatic hydrocarbon group having 1 to 30 carbon atoms; x is an integer of 1 to 3; y is 1 or 2; $A^3$ is a group selected from a carboxyl group having 2 to 30 carbon atoms, an α, γ-dionyl group having 5 to 20 carbon atoms, a hydrocarbyloxy group having 3 to 20 carbon atoms and a siloxy group tri-substituted with a hydrocarbyl group having 1 to 20 carbon atoms and/or a hydrocarbyloxy group having 1 to 20 carbon atoms; and $B^1$ is a hydroxyl group or halogen) and a titanium compound by the following Formula (VI):

$$A^4{}_z TiB^2{}_{4-z} \quad (VI)$$

(wherein $A^4$ is a group selected from an alkoxy group having 3 to 20 carbon atoms and a siloxy group tri-substituted with an alkyl group having 1 to 20 carbon atoms and/or an alkoxy group having 1 to 20 carbon atoms; $B^2$ is an α, γ-dionyl group having 5 to 20 carbon atoms; and z is 2 or 4).

To be more specific, capable being suitably used as the carboxylic acid salt of tin described above are dicarboxylic acid salt of divalent tin, dicarboxylic acid salt (including bis(hydrocarbyldicarboxylic acid) salt) of tetravalent dihydrocarbyltin, bis(α, γ-diketonate), alkoxy halide, monocarboxylic acid salt hydroxide, alkoxy(trihydrocarbyl siloxide), alkoxy(dihydrocarbylalkoxy siloxide), bis(trihydrocarbyl siloxide) and bis(dihydrocarbylalkoxy siloxide). A hydrocarbyl group bonded to tin has preferably 4 or more carbon atoms, particularly preferably 4 to 8 carbon atoms.

The titanium compound described above includes tetraalkoxide of titanium having an oxidation number of 4, dialkoxybis(α,γ-diketonate) and tetrakis(trihydrocarbyoxide), and tetrakis(trihydrocarbyoxide) is particularly suitably used.

Water alone and the forms of a solution of alcohol and a micelle dispersed in a hydrocarbon solvent are suitably used as water, and in addition thereto, capable of being effectively used as well if necessary is water potentially contained in a compound which can discharge water in a reaction system such as water adsorbed on a solid surface and hydrate water contained in a hydrate. Accordingly, combined use of the metal compound described above with compounds which can readily discharge water such as solids having adsorbed water and hydrates is given as the preferred embodiment.

The above two compounds forming the condensation accelerator may be separately added to the reaction system or may be mixed immediately before use and added in the form of a mixture, but it is not preferred to store the mixture over an extended period of time since the metal compound may be decomposed.

A use amount of the above condensation accelerator is preferably selected so that the mole ratios of the metal and the proton source of the metal compound described above to the whole amount of the hydrocarbyloxysilyl bond present in the system are 0.1 or more in both cases.

The mole numbers of the metal of the metal compound described above and water which is effective for the reaction are preferably 0.1 or more in both cases in terms of a mole ratio based on the whole amount of the hydrocarbyloxysilyl group present in the reaction system. Though the upper limit thereof is varied depending on the purposes and the reaction conditions, effective water of 0.5 to 3 mole equivalent based on the amount of the hydrocarbyloxysilyl group bonded to the active site of the polymer is preferably present at a stage before the condensation treatment.

Reaction using the above condensation accelerator is preferably carried out at a temperature of 20° C. or higher, and a range of 30 to 120° C. is more preferred. The reaction time is preferably 0.5 to 120 minutes, and a range of 3 to 60 minutes is more preferred.

In the present invention, a publicly known antioxidant and a short stop agent for the purpose of stopping the polymerization reaction can be added, if necessary, in the above modification reaction at a step after introducing the hydrocarbyloxysilyl compound residue into the active site of the polymer. Further, a condensation inhibitor such as higher carboxylic acid esters of polyhydric alcohols may be added to the reaction system after finishing the modification reaction.

After finishing the modifying treatment in the manner described above, publicly known after-treatments such as desolvent and the like are carried out, whereby the intended modified polymer can be obtained. A modified group in the polymer chain active site of the above modified polymer can be analyzed by means of a high performance liquid chromatography (HPLC) and a nuclear magnetic resonance spectroscopy (NMR).

The above modified polymer has a Mooney viscosity ($ML_{1+4}$, 100° C.) of preferably 10 to 150, more preferably 15 to 100. If the Mooney viscosity is less than 10, the rubber physical properties including the fracture characteristic can not sufficiently be obtained. On the other hand, if it exceeds 150, the workability is deteriorated, and it is difficult to knead the modified polymer with the blending agents.

Further, the present invention provides as well the modified polymer thus obtained.

The modified polymer in the present invention can be obtained by adding the condensation agent described above at a blending stage to the primary modified polymer obtained by introducing the hydrocarbyloxysilyl compound residue described above into the end of the polymer and kneading them.

The modified polymer of the present invention enhances interaction to both of silica and carbon black when used as a rubber component in silica-blended and carbon black-blended rubber compositions to improve the fracture characteristic, the abrasion resistance and the low heating property at the same time, and it can exhibit a good workability.

The rubber composition of the present invention comprises the modified polymer obtained by the process described above, and usually used is the rubber composition comprising 100 parts by weight of (A) a rubber component containing at least 15% by weight of the above modified polymer and 10 to 100 parts by weight of (B) an inorganic filler and/or carbon black.

In the rubber composition of the present invention, at least 15% by weight of the modified polymer described above is preferably contained as the rubber component for the component (A). If the above amount is less than 15% by weight, the rubber composition having desired physical properties is less liable to be obtained, and the purpose of the present invention is not achieved in a certain case. A content of the above modified polymer in the rubber component is more preferably 30% by weight or more, particularly suitably 40 to 100% by weight.

The above modified polymer may be used alone or in combination of two or more kinds thereof. The rubber component used in combination with the above modified polymer includes natural rubber and diene base synthetic rubber, and the diene base synthetic rubber includes, for example, a styrene-butadiene copolymer (SBR), polybutadiene (BR), polyisoprene (IR), butyl rubber (IIR), an ethylene-propylene copolymer and a mixture thereof. A part thereof may be provided with a branched structure by using a multifunctional modifying agent, for example, a modifying agent such as tin tetrachloride.

In the rubber composition of the present invention, an inorganic filler and/or carbon black are preferably used as a reinforcing filler for the component (B).

In this case, the inorganic filler is silica or a compound represented by the following formula:

wherein $M_1$ is at least one selected from metal selected from the group consisting of aluminum, magnesium, titanium, calcium and zirconium, oxides or hydroxides of the above metals, hydrates thereof and carbonates of the above metals; m, x, y and z each are an integer of 1 to 5, an integer of 0 to 10, an integer of 2 to 5 and an integer of 0 to 10; and when both x and z are 0 in the formula described above, the above inorganic compound is at least one metal selected from aluminum, magnesium, titanium, calcium and zirconium, metal oxide or metal hydroxide.

Capable of being used as the inorganic filler represented by the formula described above are alumina ($A^1_2O_3$) such as γ-alumina, α-alumina and the like, alumina hydrate ($A^1_2O_3H_2O$) such as boehmite, diaspore and the like, aluminum hydroxide [$Al(OH)_3$] such as gibbsite, bayerite and the like, aluminum carbonate [$Al_2(CO_3)_2$], magnesium hydroxide [$Mg(OH)_2$], magnesium oxide (MgO), magnesium carbonate ($MgCO_3$), talc ($3MgO.4SiO_2.H_2O$), attapulgite ($5MgO.8SiO_2.9H_2O$), titanium white ($TiO_2$), titanium black ($TiO_{2n-1}$), calcium oxide (CaO), calcium hydroxide [Ca(OH)$_2$], magnesium aluminum oxide ($MgO.Al_2O_3$), clay ($Al_2O_3.2SiO_2$), kaoline ($Al_2O_3.2SiO_2.2H_2O$), pyrophyllite ($Al_2O_3.4SiO_2.H_2O$), bentonite ($Al_2O_3.4SiO_2.2H_2O$), aluminum silicate ($Al_2SiO_5$, $Al_4.3SiO_4.5H_2O$ and the like), magnesium silicate ($Mg_2SiO_4$, $MgSiO_3$ and the like), calcium silicate ($Ca_2.SiO_4$ and the like), calcium aluminum silicate ($Al_2O_3.CaO.2SiO_2$ and the like), calcium magnesium silicate ($CaMgSiO_4$ and the like), calcium carbonate ($CaCO_3$), zirconium oxide ($ZrO_2$), zirconium hydroxide [$Zr(OH)_2.nH_2O$], zirconium carbonate [$Zr(CO_3)_2$] and crystalline aluminosilicates containing hydrogen, alkaline metal and alkaline earth metal which correct a charge such as various zeolites. Preferred is a case where $M_1$ in Formula (I) described above is at least one selected from aluminum metal, oxide or hydroxide of aluminum, hydrates thereof and carbonate of aluminum.

The above inorganic compounds represented by the formula described above may be used alone or in a mixture of two or more kinds thereof. The above compounds can be used as well in a mixture with silica.

In the present invention, silica is the most preferable as the inorganic filler. The above silica shall not specifically be restricted, and those optionally selected from compounds which have so far conventionally been used as a reinforcing filler for rubber can be used.

The above silica includes, for example, wet silica (silicic acid hydrate), dry silica (silicic anhydride), calcium silicate and aluminum silicate, and among them, preferred is wet silica which is the most notable in an effect for improving the fracture characteristic and a compatible effect of the wet gripping property. On the other hand, carbon black shall not specifically be restricted, and those optionally selected from compounds which have so far conventionally been used as a reinforcing filler for rubber can be used. The above carbon black includes, for example, FEF, SRF, HAF, ISAF and SAF. Preferred is carbon black having an iodine absorption number (IA) of 60 mg/g or more and a dibutyl phthalate absorption (DBP) of 80 ml/100 g or more. An effect for improving various physical properties is increased by using the above carbon black, and HAF, ISAF and SAF which are excellent in an abrasion resistance are particularly preferred.

A blending amount of the reinforcing filler for the above component (B) is preferably 10 to 100 parts by weight per 100 parts by weight of the rubber component in the component (A) described above. If a blending amount of the reinforcing filler for the component (B) is less than 10 parts by weight based on the rubber component in the component (A) described above, an effect for improving the reinforcing property and the other physical properties is less liable to be sufficiently exhibited. On the other hand, if it exceeds 100 parts by weight, it causes a reduction in the processability. Considering the reinforcing property, the other physical properties and the processability, a blending amount of the above component (B) falls particularly preferably in a range of 20 to 60 parts by weight.

When silica is used as the reinforcing filler for the component (B) in the rubber composition of the present invention, a silane coupling agent can be blended for the purpose of further improving the reinforcing property. The above silane coupling agent includes, for example, bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N, N-dimethylthiocarbamoyl tetrasulfide, 3-triethoxysilylpropyl-N,N-dimethylthiocarbamoyl tetrasulfide, 2-triethoxysilylethyl-N, N-dimethylthiocarbamonyl tetrasulfide, 3-trimethoxysilylpropylbenzothiazole tetrasulfide, 3-triethoxysilylpropylbenzothiazolyl tetrasulfide, 3-triethoxysilylpropylmethacrylate monosulfide, 3-trimethoxysilylpropylmethacrylate monosulfide, bis(3-diethoxymethylsilylpropyl)tetrasulfide, 3-mercaptopropyldimethoxymethylsilane, dimethoxymethylsilylpropyl-N, N-dimethylthiocarbamoyl tetrasulfide and dimethoxymethylsilylpropyl-benzothiazole tetrasulfide. Among them, bis(3-triethoxysilylpropyl)tetrasulfide and 3-trimethoxysilylpropylbenzothiazolyl tetrasulfide are suited in terms of an effect for improving the reinforcing property. The above silane coupling agents may be used alone or in combination of two or more kinds thereof.

In the rubber composition of the present invention, the modified polymer in which a functional group having a high affinity to silica is introduced into a molecular active site is used as the rubber component, and therefore a blending amount of the silane coupling agent can be reduced more than those of usual cases. The preferred blending amount of the silane coupling agent is varied according to the kind of the silane coupling agent, and it is selected preferably in a range of 1 to 20% by weight based on the silica. If this amount is less than 1% by weight, the effect of the coupling agent is less liable to be sufficiently exhibited. On the other hand, if it exceeds 20% by weight, a gelation in the rubber component is likely to be brought about. The preferred blending amount of the above silane coupling agent falls in a range of 5 to 15% by weight in terms of the effects of the coupling agent and a prevention in gelation.

Various chemicals usually used in the rubber industry, for example, a vulcanizing agent, a vulcanization-accelerator, a process oil, an antioxidant, a scorch preventive, zinc oxide and stearic acid can be added, if necessary, to the rubber composition of the present invention as long as the objects of the present invention are not damaged.

The vulcanizing agent described above includes sulfur, and a use amount thereof is preferably 0.1 to 10.0 parts by weight, more preferably 1.0 to 5.0 parts by weight in terms of sulfur per 100 parts by weight of the rubber component. If it is less than 0.1 part by weight, the vulcanized rubber is likely to be reduced in a rapture strength, an abrasion resistance and a low heat buildup property. On the other hand, it exceeds 10.0 parts by weight, it causes a loss in the rubber elasticity.

The vulcanization accelerator which can be used in the present invention shall not specifically be restricted, and capable of being given are, for example, vulcanization accelerator of a thiazole base such as M (2-mercaptobenzothiazole), DM (dibenzothiazyl disulfide), CZ (N-cyclohexyl-2-benzothiazylsulfenamide) and a guanidine base such as DPG (diphenylguanidine). A use amount thereof is preferably 0.1 to 5.0 parts by weight, more preferably 0.2 to 3.0 parts by weight per 100 parts by weight of the rubber component.

The process oil which can be used in the rubber composition of the present invention includes, for example, a paraffin base, a naphthene base and an aromatic base. The aromatic base is used for uses in which the tensile strength and the abrasion resistance are regarded as important, and the naphthene base or the paraffin base is used for uses in which the hysteresis loss and the low heat buildup characteristic are regarded as important. A use amount thereof is preferably 0 to 100 parts by weight per 100 parts by weight of the rubber component, and if it exceeds 100 parts by weight, the vulcanized rubber tends to be deteriorated in a tensile strength and a low heat buildup property.

The rubber composition of the present invention is obtained by kneading by means of a kneading machine such as a roll and an international mixer, and it is vulcanized after mold-processed and can be used for uses such as rubber cushions, belts, hoses and other industrial products as well as tire uses such as tire treads, under treads, side walls, carcass coating rubber, belt coating rubber, bead fillers, chafers and bead coating rubbers. In particular, it can suitably be used as rubber for tire treads.

The tire of the present invention is produced by a conventional method using the rubber composition of the present invention. That is, the rubber composition of the present invention containing, if necessary, various chemicals in the manner described above is processed into the respective members at a stage where the rubber composition is not vulcanized, and they are stuck and molded by means of a tire molding machine by a conventional method, whereby a green tire is molded. This green tire is heated and pressed in a vulcanizing machine to obtain a tire.

The tire of the present invention obtained in the manner described above has a good low fuel consumption and is excellent particularly in a rapture characteristic and an abrasion resistance, and in addition thereto, the above rubber composition has a good processability, so that it is excellent as well in a productivity.

EXAMPLES

Next, the present invention shall be explained in further details with reference to examples, but the present invention shall by no means be restricted by these examples.

The physical properties of the polymer were measured by methods described below.

<<Physical Properties of Polymer>>

A number average molecular weight (Mn) and a weight average molecular weight (Mw) of the polymer were measured by gel permeation chromatography (GPC: HLC-8020 manufactured by Toso Co., Ltd., column: GMH-XL (two serial columns) manufactured by Toso Co., Ltd.), and the differential refractive index (RI) was used to calculate them in terms of polystyrene with monodispersed polystyrene used as a standard.

A micro structure in a butadiene part of the polymer was determined by an infrared method (Molero method), and a styrene unit content in the polymer was calculated from an integral ratio in a $^1$H-NMR spectrum.

A Mooney viscosity of the polymer was measured at 100° C. by means of an RLM-01 type tester manufactured by Toyo Seiki Co., Ltd.

Further, the physical properties of the vulcanized rubber were measured by the following methods, and a Mooney viscosity of the rubber composition was measured in the following manner.

<<Physical Properties of Vulcanized Rubber>>

(1) Low Heat Buildup Property

The tan δ (50° C.) was measured at a temperature of 50° C., a distortion of 5% and a frequency of 15 Hz by means of a viscoelasticity measuring apparatus (manufactured by Rheometrix Co., Ltd.). The smaller the tan δ (50° C.), the larger the low heat buildup property.

(2) Fracture Characteristic (Tensile Stress)

The stress ($T_b$) in stretching by 300% was measured according to JIS K6301-1955.

(3) Abrasion Resistance

A Lanborn type abrasion tester was used to measure the abrasion amount at a slip rate of 60% at a room temperature, and it was shown by an index in terms of an abrasion resistance index, wherein an abrasion resistance of a control was set to 100. The larger the index, the better the abrasion resistance.

<<Mooney Viscosity of Rubber Composition>>

The Mooney viscosity ($ML_{1+4}$/130° C.) was measured at 130° C. based on JIS K6300-1994.

The dried and refined raw materials were used for polymerization unless otherwise described.

Production Example 1

Polymer A

A pressure proof glass vessel of 800 ml which was dried and substituted with nitrogen was charged with a cyclohexane solution (16%) of butadiene and a cyclohexane solution (21%) of styrene so that the butadiene monomer and the styrene monomer amounted to 40 g and 10 g respectively and then charged with 0.34 millimole of 2,2-ditetrahydrofurylpropane, and 0.38 millimole of n-butyllithium (BuLi) was added thereto, followed by carrying out polymerization in a hot water bath of 50° C. for 1.5 hour. The polymerization conversion rate was almost 100%.

Then, 0.5 ml of an isopropanol 5 weight % solution of 2,6-di-t-butyl-p-cresol (BHT) was further added to the polymerization system to terminate the polymerization, and the product was dried according to a conventional method to thereby obtain a polymer A. The analytical values of the polymer thus obtained are shown in Table 1.

Production Example 2

Polymer B

A pressure proof glass vessel of 800 ml which was dried and substituted with nitrogen was charged with a cyclohexane solution (16%) of butadiene and a cyclohexane solution (21%) of styrene so that the butadiene monomer and the styrene monomer amounted to 40 g and 10 g respectively and then charged with 0.44 millimole of ditetrahydrofurylpropane, and 0.48 millimole of n-butyllithium (BuLi) was further added thereto, followed by carrying out polymerization at 50° C. for 1.5 hour. The polymerization conversion rate was almost 100%.

Tetraethoxysilane 0.43 millimole was added to the above polymerization system, and then modification reaction was further carried out at 50° C. for 30 minutes. Thereafter, 0.5 ml of an isopropanol 5 weight % solution of 2,6-di-t-butyl-p-cresol (BHT) was added to the polymerization system to terminate the polymerization, and the product was dried according to a conventional method to thereby obtain a polymer B. The analytical values of the polymer thus obtained are shown in Table 1.

Production Examples 3 to 7

Polymers C to G

A polymer C to a polymer G were obtained in the same manner as in Production Example 2, except that in Production Example 2, modifying agents of kinds shown in Table 1 were substituted for tetraethoxysilane which was a modifying agent. The analytical values of the respective polymers thus obtained are shown in Table 1.

Production Example 8

Polymer H

A pressure proof glass vessel of 800 ml which was dried and substituted with nitrogen was charged with a cyclohexane solution (16%) of butadiene and a cyclohexane solution (21%) of styrene so that the butadiene monomer and the styrene monomer amounted to 40 g and 10 g respectively and then charged with 0.44 millimole of 2,2-ditetrahydrofurylpropane, and 0.48 millimole of n-butyllithium (BuLi) was added thereto, followed by carrying out polymerization in a hot water bath of 50° C. for 1.5 hour. The polymerization conversion rate was almost 100%.

Tetraethoxysilane 0.43 millimole was added to the above polymerization system, and then modification reaction was further carried out at 50° C. for 30 minutes. Then, 1.26 millimole of tin bis(2-ethylhexanoate) and 1.26 millimole of water were added to the polymerization system, followed by carrying out condensation reaction at 50° C. for 30 minutes. Thereafter, 0.5 ml of an isopropanol 5 weight % solution of 2,6-di-t-butyl-p-cresol (BHT) was further added to the polymerization system to terminate the polymerization, and the product was dried according to a conventional method to thereby obtain a polymer H. The analytical values of the polymer thus obtained are shown in Table 1.

Production Examples 9 to 12

Polymers I to L

A polymer I to a polymer L were obtained in the same manner as in Production Example 8, except that in Production Example 8, modifying agents of kinds shown in Table 1 were substituted for tetraethoxysilane which was a modifying agent. The analytical values of the polymers thus obtained are shown in Table 1.

Production Example 13

Polymer M

A polymer M was obtained in the same manner as in Production Example 8, except that in Production Example 8, titanium tetrakis(2-ethylhexyl oxide) was substituted for tin bis(2-ethylhexanoate) which was a condensation accelerator. The analytical values of the polymer thus obtained are shown in Table 1.

Production Example 14

Polymer N

A polymer N was obtained in the same manner as in Production Example 8, except that in Production Example 8, lithium hexamethyleneimide (hexamethyleneimide/Li=0.9) which was prepared in the reaction system was used in an amount of 0.48 millimole in terms of a lithium equivalent in place of n-butyllithium which was a polymerization initiator. The analytical values of the polymer thus obtained are shown in Table 1.

Production Example 15

Polymer O

A polymer O was obtained in the same manner as in Production Example 2, except that in Production Example 2, lithium hexamethyleneimide (hexamethyleneimide/Li=0.9) which was prepared in the reaction system was used in an amount of 0.48 millimole in terms of a lithium equivalent in place of n-butyllithium which was a polymerization initiator. The analytical values of the polymer thus obtained are shown in Table 1.

TABLE 1

|  |  | Production Example | | | | |
|---|---|---|---|---|---|---|
|  |  | 1 | 2 | 3 | 4 | 5 |
| Kind of polymer |  | A | B | C | D | E |
| Polymerization initiator | Kind | BuLi | BuLi | BuLi | BuLi | BuLi |
|  | Amount (mmole) | 0.38 | 0.48 | 0.48 | 0.48 | 0.48 |
| Modification | Modifying agent Kind | — | TEOS | TTC | TEOSPDI | DMBTESPA |
|  | Amount (mmole) | — | 0.43 | 0.43 | 0.43 | 0.43 |
| Molecular weight ($\times 10^4$) | Base Mw | 28.0 | 18.9 | 18.8 | 18.4 | 18.3 |
|  | Total Mw | 28.0 | 31.4 | 57.2 | 35.4 | 23.2 |
| Micro structure | Styrene unit Content (wt %) | 20.0 | 19.8 | 20.0 | 19.5 | 20.1 |
|  | Vinyl group content (wt %) | 52 | 52.1 | 51.9 | 52 | 51.7 |
| Condensation accelerator | Kind | — | — | — | — | — |
| Mooney viscosity ($ML_{1+4}/100°$ C.) |  | 64 | 52 | 76 | 60 | 32 |

|  |  | Production Example | | | | |
|---|---|---|---|---|---|---|
|  |  | 6 | 7 | 8 | 9 | 10 |
| Kind of polymer |  | F | G | H | I | J |
| Polymerization initiator | Kind | BuLi | BuLi | BuLi | BuLi | BuLi |
|  | Amount (mmole) | 0.48 | 0.48 | 0.48 | 0.48 | 0.48 |
| Modification | Modifying agent Kind | GPMOS | GPEOS | TEOS | TEOSPDI | DMBTESPA |
|  | Amount (mmole) | 0.43 | 0.43 | 0.43 | 0.43 | 0.43 |
| Molecular weight ($\times 10^4$) | Base Mw | 18.6 | 18.4 | 18.5 | 18.4 | 18.5 |
|  | Total Mw | 29.4 | 29.1 | 68.4 | 62.3 | 60.2 |
| Micro structure | Styrene unit content (wt %) | 20.6 | 21.0 | 19.9 | 19.8 | 20.3 |
|  | Vinyl group content (wt %) | 51.9 | 52.5 | 52 | 52.3 | 51.8 |
| Condensation accelerator | Kind | — | — | BEHAS | BEHAS | BEHAS |
| Mooney viscosity ($ML_{1+4}/100°$ C.) |  | 48 | 47 | 84 | 72 | 68 |

|  |  | Production Example | | | | |
|---|---|---|---|---|---|---|
|  |  | 11 | 12 | 13 | 14 | 15 |
| Kind of polymer |  | K | L | M | N | O |
| Polymerization initiator | Kind | BuLi | BuLi | BuLi | HMI | HMI |
|  | Amount (mmole) | 0.48 | 0.48 | 0.48 | 0.48 | 0.48 |
| Modification | Modifying agent Kind | GPMOS | GPEOS | TEOS | TEOS | TEOS |
|  | Amount (mmole) | 0.43 | 0.43 | 0.43 | 0.43 | 0.43 |
| Molecular weight ($\times 10^4$) | Base Mw | 18.4 | 18.9 | 18.6 | 18.6 | 18.6 |
|  | Total Mw | 57.2 | 55.4 | 42.2 | 42.4 | 30.8 |
| Micro structure | Styrene unit content (wt %) | 20.1 | 19.8 | 19.9 | 19.9 | 19.8 |
|  | Vinyl group content (wt %) | 52.6 | 52 | 52 | 52 | 52.2 |
| Condensation accelerator | Kind | BEHAS | BEHAS | TEHO | BEHAS | — |
| Mooney viscosity ($ML_{1+4}/100°$ C.) |  | 70 | 68 | 64 | 82 | 54 |

Remarks:
Base Mw: weight average molecular (Mw) before modification reaction
Total Mw: weight average molecular (Mw) after first stage modification reaction
BEHAS: tin bis(2-ethylhexanoate)
TEHO: titanium tetrakis(2-ethylhexyl oxide)
HMI: hexamethyleneiminolithium synthesized in the polymerization system
TEOS: tetraethoxysilane
TTC: tin tetrachloride
TEOSPDI: N-(3-triethoxysilylpropyl)-4,5-dihydroimidazole
DMBTESPA: N-(1,3-dimethylbutylidene)-3-(triethoxysilyl)-1-propaneamine
GPMOS: 3-glycidoxypropyltrimethoxysilane
GPEOS: 3-glycidoxypropyltriethoxysilane Examples 1 to 7 and Comparative Examples 1 to 8

The polymers obtained in Production Examples 1 to 15 were used to prepare silica-blended rubber compositions and carbon black-blended rubber compositions respectively according to a composition 1 and a composition 2 each shown in Table 2 by methods shown below, and the rubber compositions were measured for a Mooney viscosity and then vulcanized on the conditions of 160° C. and 15 minutes to measure the physical properties of the vulcanized rubbers. The results thereof are shown in Table 3.

Example 8

The polymer D was used to prepare a silica-blended rubber composition and a carbon black-blended rubber composition respectively according to a composition 3 and a composition 4 each shown in Table 2 by methods shown below, and the rubber compositions were measured for a Mooney viscosity and then vulcanized on the conditions of 160° C. and 15 minutes to measure the physical properties of the vulcanized rubbers. The results thereof are shown in Table 3.

Composition 1 Silica-Blended:

Silica, aroma oil, stearic acid, a coupling agent and an antioxidant 6C were blended with 80 parts by weight of the polymer of a kind shown in Table 1 and 20 parts by weight of natural rubber according to the composition 1 shown in Table 2 to prepare a master batch, and zinc oxide, vulcanization accelerators DPG, DM and NS and sulfur were further blended therewith to prepare a silica-blended rubber composition.

Composition 2 Carbon Black-Blended:

Carbon black, aroma oil, stearic acid, a coupling agent and the antioxidant 6C were blended with 80 parts by weight of the polymer of a kind shown in Table 1 and 20 parts by weight of natural rubber according to the composition 2 shown in Table 2 to prepare a master batch, and zinc oxide, the vulcanization accelerators DPG, DM and NS and sulfur were further blended therewith to prepare a carbon black-blended rubber composition.

Composition 3 Silica-Blended:

A silica-blended rubber composition was prepared in the same manner as in Composition 1, except that the condensation accelerator BEHAS was added at the first stage where the master batch was prepared.

Composition 4 Carbon Black-Blended:

A carbon black-blended rubber composition was prepared in the same manner as in Composition 2, except that the condensation accelerator BEHAS was added at the first stage where the master batch was prepared.

TABLE 2

| | | | Composition 1 (wt part) | Composition 2 (wt part) | Composition 3 (wt part) | Composition 4 (wt part) |
|---|---|---|---|---|---|---|
| First stage | Polymer | | 80 | 80 | 80 | 80 |
| | Natural rubber | | 20 | 20 | 20 | 20 |
| | Carbon black | | — | 50 | — | 50 |
| | Silica | | 55 | — | 55 | — |
| | Aroma oil | | 10 | 10 | 10 | 10 |
| | Stearic acid | | 2 | 2 | 2 | 2 |
| | Coupling agent | | 5.5 | — | 5.5 | — |
| | Antioxidant 6C | | 1 | 1 | 1 | 1 |
| | Condensation accelerator BEHAS | | 0 | 0 | 0.94 | 0.94 |
| Second stage | Zinc oxide | | 3 | 3 | 3 | 3 |
| | Vulcanization accelerator | DPG | 1 | 0.5 | 1 | 0.5 |
| | | DM | 1 | 0.5 | 1 | 0.5 |
| | | NS | 1 | 0.5 | 1 | 0.5 |
| | Sulfur | | 1.5 | 1.5 | 1.5 | 1.5 |

Remarks:
Silica: [Nipsil AQ (brand name)] manufactured by Nippon Silica Ind. Co., Ltd.
Carbon black: [Seast KH (N339) (brand name)] manufactured by Tokai Carbon Co., Ltd.
Coupling agent: silane coupling agent [Si69 (brand name)] manufactured by Degussa Co., Ltd., bis(3-triethoxysilylpropyl) tetrasulfide
Antioxidant 6C: N-(1,3-dimethylbutyl)-N'-phenyl-p-phenylenediamine
Vulcanization accelerator DPG: diphenylquanidine
Vulcanization accelerator DM: mercaptobenzothiazyl disulfide
Vulcanization-accelerator NS: N-t-butyl-2-benzothiazylsulfenamide
Condensation accelerator BEHAS: tin bis(2-ethylhexanoat)

TABLE 3

| | | Comparative Example | | | | |
|---|---|---|---|---|---|---|
| | | 1 | 2 | 3 | 4 | 5 |
| Kind of polymer | | A | B | C | D | E |
| Silica-blended rubber composition | Mooney viscosity [$ML_{1+4}$/130° C.] | 42 | 43 | 40 | 38 | 47 |
| | Tensile strength [$T_b$] (MPa) | 20.2 | 19.9 | 18.1 | 21.6 | 18.1 |
| | Low heat buildup property [tan δ] | 0.162 | 0.145 | 0.163 | 0.121 | 0.093 |
| | Abrasion resistance | 100 | 106 | 104 | 112 | 113 |

TABLE 3-continued

| | | | | | | |
|---|---|---|---|---|---|---|
| Carbon black-blended rubber composition | Mooney viscosity [ML$_{1+4}$/130° C.] | 43 | 42 | 45 | 54 | 65 |
| | Tensile strength [T$_b$] (MPa) | 19.7 | 20.2 | 21 | 21.6 | 18.8 |
| | Low heat buildup property [tan δ] | 0.189 | 0.155 | 0.148 | 0.126 | 0.145 |
| | Abrasion resistance | 100 | 100 | 104 | 103 | 110 |

| | | Comparative Example | | Example | | |
|---|---|---|---|---|---|---|
| | | 6 | 7 | 1 | 2 | 3 |
| Kind of polymer | | F | G | H | I | J |
| Silica-blended rubber composition | Mooney viscosity [ML$_{1+4}$/130° C.] | 44 | 43 | 55 | 40 | 47 |
| | Tensile strength [T$_b$] (MPa) | 18.6 | 18.5 | 18.2 | 20.7 | 17.6 |
| | Low heat buildup property [tan δ] | 0.124 | 0.129 | 0.110 | 0.104 | 0.084 |
| | Abrasion resistance | 109 | 107 | 111 | 119 | 118 |
| Carbon black-blended rubber composition | Mooney viscosity [ML$_{1+4}$/130° C.] | 50 | 48 | 64 | 52 | 49 |
| | Tensile strength [T$_b$] (MPa) | 19.7 | 19.5 | 20.6 | 18.8 | 21.6 |
| | Low heat buildup property [tan δ] | 0.148 | 0.152 | 0.151 | 0.119 | 0.132 |
| | Abrasion resistance | 105 | 104 | 104 | 105 | 115 |

| | | Example | | | | Comparative | |
|---|---|---|---|---|---|---|---|
| | | 4 | 5 | 6 | 7 | Example 8 | Example 8 |
| Kind of polymer | | K | L | M | N | O | D |
| Silica-blended rubber composition | Mooney viscosity [ML$_{1+4}$/130° C.] | 65 | 62 | 50 | 58 | 45 | 43 |
| | Tensile strength [T$_b$] (MPa) | 18.2 | 18.3 | 19.5 | 19.9 | 20.3 | 21.0 |
| | Low heat buildup property [tan δ] | 0.112 | 0.111 | 0.131 | 0.107 | 0.125 | 0.113 |
| | Abrasion resistance | 110 | 108 | 108 | 117 | 110 | 114 |
| Carbon black-blended rubber composition | Mooney viscosity [ML$_{1+4}$/130° C.] | 62 | 60 | 61 | 66 | 62 | 58 |
| | Tensile strength [T$_b$] (MPa) | 19.6 | 20.2 | 20.6 | 18.8 | 20.2 | 20.8 |
| | Low heat buildup property [tan δ] | 0.135 | 0.132 | 0.164 | 0.120 | 0.147 | 0.124 |
| | Abrasion resistance | 107 | 106 | 104 | 106 | 104 | 105 |

(The abrasion resistance is a value shown by an index, wherein the value of Comparative Example 1 was set to 100)

It can be found from the results described above that the modified polymers of the present invention (Examples 1 to 7) inhibit a rise in the Mooney viscosity and are excellent in the low heating property and the abrasion resistance in either case of silica blending and carbon black blending. In particular, an effect for improving the abrasion resistance and the low loss property (low heat buildup property) in the silica base is notable.

Further, the same tendency is observed as well in Example 8 in which the condensation accelerator was added in blending.

INDUSTRIAL APPLICABILITY

According to the present invention, capable of being provided is a modified polymer which enhances interactions with silica and carbon black when used for both of silica-blended and carbon black-blended rubber compositions and which elevates the fracture characteristic, the abrasion resistance and the lower heat buildup property at the same time and can exhibit a good workability.

In particular, in a tire tread for cars in which the rubber composition of the present invention is used, a hysteresis loss of the vulcanized rubber can be reduced as well in a composition containing a lot of an inorganic filler, and the reinforcing property is improved to a large extent.

Further, when adding the condensation accelerator to the polymer after modification reaction, the cold flow resistance is improved as well, and therefore there is the advantage that a polyvalent coupling agent used for improving a cold flow resistance does not have to be used.

What is claimed is:

1. A process for producing a modified polymer, comprising a first and second modification process, the first modification process comprising modifying a polymer produced by anionic polymerization using an alkaline metal compound and/or an alkaline earth metal compound as a polymerization initiator and having an active site of an organometal in a molecule by reacting the site thereof with a hydrocarbyloxysilane compound, and the second modification process comprising adding a condensation accelerator to the reaction system in the middle of the above reaction, or adding a condensation accelerator to the reaction system in the middle of the above reaction and after the completion thereof, the condensation accelerator accelerates condensation of the modified polymer resulting in a condensed polymer, the condensed polymer being recovered from the system, wherein the polymer described above is a polymer obtained by homopolymerizing a conjugated diene compound or copolymerizing a conjugated diene compound with at least one additional monomer, and the hydrocarbyloxysilane compound described above used for the modification is at least one selected from a hydrocarbyloxysilane compound represented by Formula (I) and/or a partial condensation product thereof;

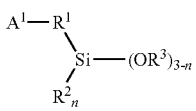
(I)

(wherein $A^1$ represents a monovalent group having at least one functional group selected from (thio)epoxy, (thio)isocyanate, (thio)ketone, (thio)aldehyde, imine, amide, trihydrocarbyl isocyanurate, (thio)carboxylates, metal salts of (thio)carboxylates, carboxylic anhydrides, carboxylic halides and dihydrocarbyl carbonate; $R^1$ represents a single bond or a divalent inactive hydrocarbon group; $R^2$ and $R^3$ each represent independently a monovalent aliphatic hydrocarbon group having 1 to 20 carbon atoms or a monovalent aromatic hydrocarbon group having 6 to 18 carbon atoms; n is an integer of 0 to 2, and when a plurality of $OR^3$ is present, a plurality $OR^3$ may be the same as or different from each other; and an active proton and an onium salt are not contained in the molecule), and a hydrocarbyloxysilane compound represented by Formula (II) and/or a partial condensation product thereof;

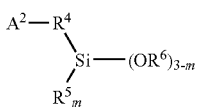
(II)

(wherein $A^2$ represents a monovalent group having at least on functional group selected from cyclic tertiary amine, non-cyclic tertiary amine, nitrile, pyridine, sulfide and multisulfide; $R^4$ represents a single bond or a divalent inactive hydrocarbon group; $R^5$ and $R^6$ each represent independently a monovalent aliphatic hydrocarbon group having 1 to 20 carbon atoms or a monovalent aromatic hydrocarbon group having 6 to 18 carbon atoms; m is an integer of 0 to 2, and when a plurality of $OR^6$ is present, a plurality $OR^6$ may be the same as or different from each other; and an active proton and an onium salt are not contained in the molecule).

2. The process for producing a modified polymer as described in claim 1, wherein the metal in the active site is at least one selected from alkaline metals and alkaline earth metals.

3. The process for producing a modified polymer as described in claim 1, wherein the at least one additional monomer is an aromatic vinyl compound.

4. The process for producing a modified polymer as described in claim 3, wherein the aromatic vinyl compound is styrene.

5. The process for producing a modified polymer as described in claim 3, wherein the active site is present at an end of the polymer, and at least a part thereof stays in an active state.

6. The process for producing a modified polymer as described in claim 1, wherein the hydrocarbyloxysilane compound for modification is added to the polymer having an active site of an organometal in a molecule in a stoichiometric amount or an excess amount thereover based on the active site to react the active site with the hydrocarbyloxysilane compound.

7. The process for producing a modified polymer as described in claim 1, wherein the condensation accelerator comprises combination of carboxylic acid salt of tin and/or titanium alkoxide with water.

8. The process for producing a modified polymer as described in claim 7, wherein the carboxylic acid salt of tin is tin bis(2-ethylhexanoate) and the titanium alkoxide is titanium tetrakis(2-ethylhexyl oxide).

9. The process for producing a modified polymer as described in claim 7, wherein the carboxylic acid salt of tin is a tin compound having an oxidation number of 2 represented by the following Formula (IV):

$$Sn(OCOR^9)_2 \qquad (IV)$$

(wherein $R^9$ is an alkyl group having 2 to 19 carbon atoms) or a tin compound having an oxidation number of 4 represented by the following Formula (V):

$$R^{10}{}_xSnA^3{}_yB^1{}_{4-y-x} \qquad (V)$$

(wherein $R^{10}$ is an aliphatic hydrocarbon group having 1 to 30 carbon atoms; x is an integer of 1 to 3; y is 1 or 2; $A^3$ is a group selected from a carboxyl group having 2 to 30 carbon atoms, an $\alpha,\gamma$-dionyl group having 5 to 20 carbon atoms, a hydrocarbyloxy group having 3 to 20 carbon atoms and a siloxy group tri-substituted with a hydrocarbyl group having 1 to 20 carbon atoms and/or a hydrocarbyloxy group having 1 to 20 carbon atoms; and $B^1$ is a hydroxyl group or halogen), and the titanium alkoxide is a titanium compound by the following Formula (VI):

$$A^4{}_zTiB^2{}_{4-z} \qquad (VI)$$

(wherein $A^4$ is a group selected from an alkoxy group having 3 to 20 carbon atoms and a siloxy group tri-substituted with an alkyl group having 1 to 20 carbon atoms and/or an alkoxy group having 1 to 20 carbon atoms; $B^2$ is an $\alpha,\gamma$-dionyl group having 5 to 20 carbon atoms; and z is 2 or 4).

10. The process for producing a modified polymer as described in claim 1, wherein the conjugated diene compound is 1,3-butadiene or isoprene.

11. A modified polymer obtained by the production process as described in claim 1, where the modified polymer is condensed at a modified moiety of said polymer.

12. The modified polymer as described in claim 11, having a Mooney viscosity ($ML_{1+4}/100°$ C.) of 10 to 150.

13. A rubber composition comprising the modified polymer as described in claim 11 or 12.

14. The rubber composition as described in claim 13, comprising 100 parts by weight of (A) a rubber component containing at least 15% by weight of the modified polymer and 10 to 100 parts by weight of (B) an inorganic filler and/or carbon black.

15. The rubber composition as described in claim 14, comprising 10 to 100 parts by weight of silica as the inorganic filler.

16. A tire using the rubber composition as described in claim 13.

17. The modified polymer as described in claim 11, having a weight average molecular weight (Mw) of $55.4 \times 10^4$ to $62.3 \times 10^4$.

18. The process for producing a modified polymer as described in claim 1, wherein the anionic polymerization is conducted in the presence of a randomizer.

19. A process for producing a modified polymer, comprising a first and second modification process, the first modification process comprising modifying a polymer produced by anionic polymerization using an alkaline metal compound and/or an alkaline earth metal compound as a polymerization initiator and having an active site of an organometal in a molecule by reacting the site thereof with a hydrocarbyloxysilane compound, and the second modification process comprising adding a condensation accelerator to the reaction system after the completion thereof, the condensation accelerator accelerates condensation of the modified polymer resulting in a condensed polymer, the condensed polymer being recovered from the system, wherein the polymer described above is a polymer obtained by homopolymerizing a conjugated diene compound or copolymerizing a conjugated diene compound with at least one additional monomer, and the hydrocarbyloxysilane compound described above used for the modification is at least one selected from a hydrocarbyloxysilane compound represented by Formula (I) and/or a partial condensation product thereof;

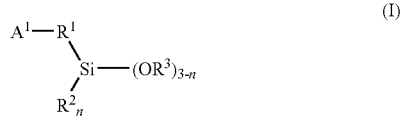

(wherein $A^1$ represents a monovalent group having at least one functional group selected from (thio)epoxy, (thio)isocyanate, (thio)ketone, (thio)aldehyde, imine, amide, trihydrocarbyl isocyanurate, (thio)carboxylates, metal salts of (thio)carboxylates, carboxylic anhydrides, carboxylic halides and dihydrocarbyl carbonate; $R^1$ represents a single bond or a divalent inactive hydrocarbon group; $R^2$ and $R^3$ each represent independently a monovalent aliphatic hydrocarbon group having 1 to 20 carbon atoms or a monovalent aromatic hydrocarbon group having 6 to 18 carbon atoms; n is an integer of 0 to 2, and when a plurality of $OR^3$ is present, a plurality $OR^3$ may be the same as or different from each other; and an active proton and an onium salt are not contained in the molecule), and a hydrocarbyloxysilane compound represented by Formula (II) and/or a partial condensation product thereof;

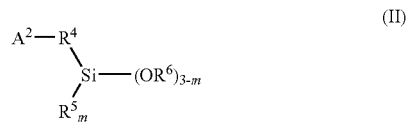

(wherein $A^2$ represents a monovalent group having at least on functional group selected from cyclic tertiary amine, non-cyclic tertiary amine, nitrile, pyridine, sulfide and multisulfide; $R^4$ represents a single bond or a divalent inactive hydrocarbon group; $R^5$ and $R^6$ each represent independently a monovalent aliphatic hydrocarbon group having 1 to 20 carbon atoms or a monovalent aromatic hydrocarbon group having 6 to 18 carbon atoms; m is an integer of 0 to 2, and when a plurality of $OR^6$ is present, a plurality $OR^6$ may be the same as or different from each other; and an active proton and an onium salt are not contained in the molecule).

20. The process for producing a modified polymer as described in claim 19, wherein the metal in the active site is at least one selected from alkaline metals and alkaline earth metals.

21. The process for producing a modified polymer as described in claim 19, wherein the at least one additional monomer is an aromatic vinyl compound.

22. The process for producing a modified polymer as described in claim 21, wherein the active site is present at an end of the polymer, and at least a part thereof stays in an active state.

23. The process for producing a modified polymer as described in claim 21, wherein the aromatic vinyl compound is styrene.

24. The process for producing a modified polymer as described in claim 19, wherein the hydrocarbyloxysilane compound for modification is added to the polymer having an active site of an organometal in a molecule in a stoichiometric amount or an excess amount thereover based on the active site to react the active site with the hydrocarbyloxysilane compound.

25. The process for producing a modified polymer as described in claim 19, wherein the condensation accelerator comprises combination of carboxylic acid salt of tin and/or titanium alkoxide with water.

26. The process for producing a modified polymer as described in claim 25, wherein the carboxylic acid salt of tin is a tin compound having an oxidation number of 2 represented by the following Formula (IV):

(wherein $R^9$ is an alkyl group having 2 to 19 carbon atoms) or a tin compound having an oxidation number of 4 represented by the following Formula (V):

(wherein $R^{10}$ is an aliphatic hydrocarbon group having 1 to 30 carbon atoms; x is an integer of 1 to 3; y is 1 or 2; $A^3$ is a group selected from a carboxyl group having 2 to 30 carbon atoms, an α,γ-dionyl group having 5 to 20 carbon atoms, a hydrocarbyloxy group having 3 to 20 carbon atoms and a siloxy group tri-substituted with a hydrocarbyl group having 1 to 20 carbon atoms and/or a hydrocarbyloxy group having 1 to 20 carbon atoms; and $B^1$ is a hydroxyl group or halogen), and the titanium alkoxide is a titanium compound by the following Formula (VI):

$$A^4{}_z TiB^2{}_{4-z} \quad (VI)$$

(wherein $A^4$ is a group selected from an alkoxy group having 3 to 20 carbon atoms and a siloxy group tri-substituted with an alkyl group having 1 to 20 carbon atoms and/or an alkoxy group having 1 to 20 carbon atoms; $B^2$ is an α,γ-dionyl group having 5 to 20 carbon atoms; and z is 2 or 4).

27. The process for producing a modified polymer as described in claim 25, wherein the carboxylic acid salt of tin is tin bis(2-ethylhexanoate) and the titanium alkoxide is titanium tetrakis(2-ethylhexyl oxide).

28. The process for producing a modified polymer as described in claim 19, wherein the conjugated diene compound is 1,3-butadiene or isoprene.

29. A modified polymer obtained by the production process as described in claim 19, where the modified polymer is condensed at a modified moiety of said polymer.

30. The modified polymer as described in claim 29, having a Mooney viscosity ($ML_{1+4}/100°$ C.) of 10 to 150.

31. A rubber composition comprising the modified polymer as described in claim 29 or 30.

32. The rubber composition as described in claim 31, comprising 100 parts by weight of (A) a rubber component containing at least 15% by weight of the modified polymer and 10 to 100 parts by weight of (B) an inorganic filler and/or carbon black.

33. The rubber composition as described in claim 32, comprising 10 to 100 parts by weight of silica as the inorganic filler.

34. A tire using the rubber composition as described in claim 31.

35. The modified polymer as described in claim 29, having a weight average molecular weight (Mw) of $55.4 \times 10^4$ to $62.3 \times 10^4$.

36. The process for producing a modified polymer as described in claim 19, wherein the anionic polymerization is conducted in the presence of a randomizer.

* * * * *